US008045794B2

(12) United States Patent
Yamaguchi et al.

(10) Patent No.: US 8,045,794 B2
(45) Date of Patent: Oct. 25, 2011

(54) IMAGE PROCESSING METHOD AND DEVICE FOR RESTORING SUB-INFORMATION FROM COMPOSITE IMAGE INFORMATION

(75) Inventors: Takashi Yamaguchi, Kawasaki (JP); Shinya Tokuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1249 days.

(21) Appl. No.: 11/713,625

(22) Filed: Mar. 5, 2007

(65) Prior Publication Data
US 2007/0223780 A1  Sep. 27, 2007

(30) Foreign Application Priority Data
Mar. 7, 2006  (JP) .................................. 2006-060636

(51) Int. Cl.
*G06K 9/00* (2006.01)
(52) U.S. Cl. ....................................................... 382/162
(58) Field of Classification Search ........................ None
See application file for complete search history.

(56) References Cited

U.S. PATENT DOCUMENTS

| | | | | |
|---|---|---|---|---|
| 6,763,122 | B1 * | 7/2004 | Rodriguez et al. | 382/100 |
| 6,883,982 | B2 * | 4/2005 | Tokuda et al. | 400/76 |
| 6,885,755 | B2 | 4/2005 | Yamaguchi | |
| 6,901,862 | B2 | 6/2005 | Yamaguchi et al. | |
| 7,391,880 | B2 * | 6/2008 | Reed et al. | 382/100 |
| 7,693,300 | B2 * | 4/2010 | Reed et al. | 382/100 |
| 2004/0042636 | A1 | 3/2004 | Oh | |
| 2004/0125983 | A1 * | 7/2004 | Reed et al. | 382/100 |
| 2004/0215965 | A1 * | 10/2004 | Tokuda et al. | 713/176 |
| 2005/0134622 | A1 * | 6/2005 | Yamaguchi et al. | 347/15 |
| 2005/0157149 | A1 | 7/2005 | Yamaguchi et al. | |
| 2007/0223780 | A1 * | 9/2007 | Yamaguchi et al. | 382/100 |
| 2009/0252370 | A1 * | 10/2009 | Picard et al. | 382/100 |

FOREIGN PATENT DOCUMENTS

| | | |
|---|---|---|
| EP | 1385121 A1 | 1/2004 |
| EP | 1471722 A2 | 10/2004 |
| JP | 2001-268346 | 9/2001 |
| JP | 2005-184603 | 7/2005 |
| WO | WO 2005/059897 A1 | 6/2005 |

OTHER PUBLICATIONS

European Search Report dated Jan. 27, 2009 for Appln. No. 07004514.1-2202.

Xiaoqiang Li et al.; "Multi-Channel Data Hiding Scheme for Color Images"; Department of Computer Science & Engineering, Fudan University, Shanghai 200433, China; Apr. 28, 2003, pp. 569-573.

* cited by examiner

*Primary Examiner* — Jingge Wu
*Assistant Examiner* — Tahmina Ansari
(74) *Attorney, Agent, or Firm* — Pillsbury Winthrop Shaw Pittman, LLP (57) ABSTRACT

In an image processing device adapted to restore sub-information from composite image information produced by a composite image producing device which embeds invisible sub-information into visible main image information to produce the composite image information, the frequency components of the sub-information extracted for each of its color components are smoothed, and the optimum one is selected from among the results of the smoothing process performed for each color component of the sub-information.

22 Claims, 9 Drawing Sheets

IMAGE PROCESSING METHOD AND DEVICE FOR RESTORING SUB-INFORMATION FROM COMPOSITE IMAGE INFORMATION

CROSS-REFERENCE TO RELATED APPLICATIONS

This application is based upon and claims the benefit of priority from prior Japanese Patent Application No. 2006-060636, filed Mar. 7, 2006, the entire contents of which are incorporated herein by reference.

BACKGROUND OF THE INVENTION

1. Field of the Invention

The present invention relates to an image processing method and devices adapted to embed invisible sub-information (e.g., security information) into visible main image information (e.g., an image of a human face) to produce composite image information and, at a later time, restore the sub-information from the composite image information.

2. Description of the Related Art

With the recent spread of digital information and the Internet, techniques of digital watermarking, digital signatures and the like have come to be regarded as important in order to prevent forgery or alteration of images. In particular, digital watermarking techniques, in which invisible sub-information is embedded in visible main image information, have been proposed as measures against unauthorized copying, forgery or alteration of identification (ID) cards or photographs having copyright information embedded.

For example, JP-A 2001-268346 (KOKAI) (document 1) and JP-A 2005-184603 (KOKAI) (document 2) each disclose a digital watermarking technique of embedding sub-information by superimposing the sub-information upon main image information utilizing color difference information.

Such a digital watermarking technique, which involves embedding to-be-embedded information, such as sub-information (digital watermarks), into main image information in a invisible form, requires a sub-information restoration process at a later time.

Conventionally, there have been various techniques to restore sub-information. Among these is a frequency filtering technique utilizing frequency domain.

In general, the digital watermarking technique is supposed to handle digital data and hence involves analog-to-digital and digital-to-analog conversion in restoring sub-information (digital watermark information) from a digitally watermarked image restored by an image recorder (a color printer or the like). It is therefore difficult to avoid the occurrence of degradation of the image quality. For this reason, there is a demand for a technique to minimize the degradation of sub-information in restoration.

With the method disclosed in document 2 which involves embedding digital watermarks by superimposing to-be-embedded information on main image information, the restoration of digital watermarks tends to be affected by the color and the frequency distribution of the main image information.

BRIEF SUMMARY OF THE INVENTION

It is an object of the invention to provide an image processing method and devices which allow stable restoration of sub-information from a composite image produced by embedding the sub-information into main image information.

According to an aspect of the invention, there is provided an image processing method of restoring, from composite image information produced through a composite image producing process which involves embedding invisible sub-information into visible main image information to produce the composite image information, the sub-information, comprising the processes of: separating the composite image information into a plurality of color components; extracting frequency components of the sub-information from each of the separated color components of the main image information; smoothing the extracted frequency components of the sub-information in each of the plurality of color components; selecting one from among the results of the smoothing process for frequency components in the plurality of color components; normalizing the selected result of the smoothing process; and outputting the result of the normalizing process.

According to another aspect of the invention, there is provided an image processing device adapted to restore, from composite image information produced by a composite image producing device which embeds invisible sub-information into visible main image information to produce the composite image information, the sub-information, comprising: a color separation unit configured to the composite image information into a plurality of color components; extraction units each of which is configured to extract frequency components of the sub-information contained in a corresponding one of the plurality of color components; smoothing units each of which is configured to smooth the frequency components of the sub-information extracted by a corresponding one of the smoothing units; a selection unit configured to select one of the outputs of the smoothing units; a normalization unit configured to normalize the selected one of the outputs of the smoothing units; and an output unit configured to output the output of the normalization unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The preferred embodiments of the present invention will be described hereinafter with reference to the accompanying drawings.

Although, in the description which follows, the invention will be described in terms of processing of a face image for personal authentication on an ID card, the principles of the invention are equally applicable to processing of other images.

A first embodiment will be described below.

Figure 1A:
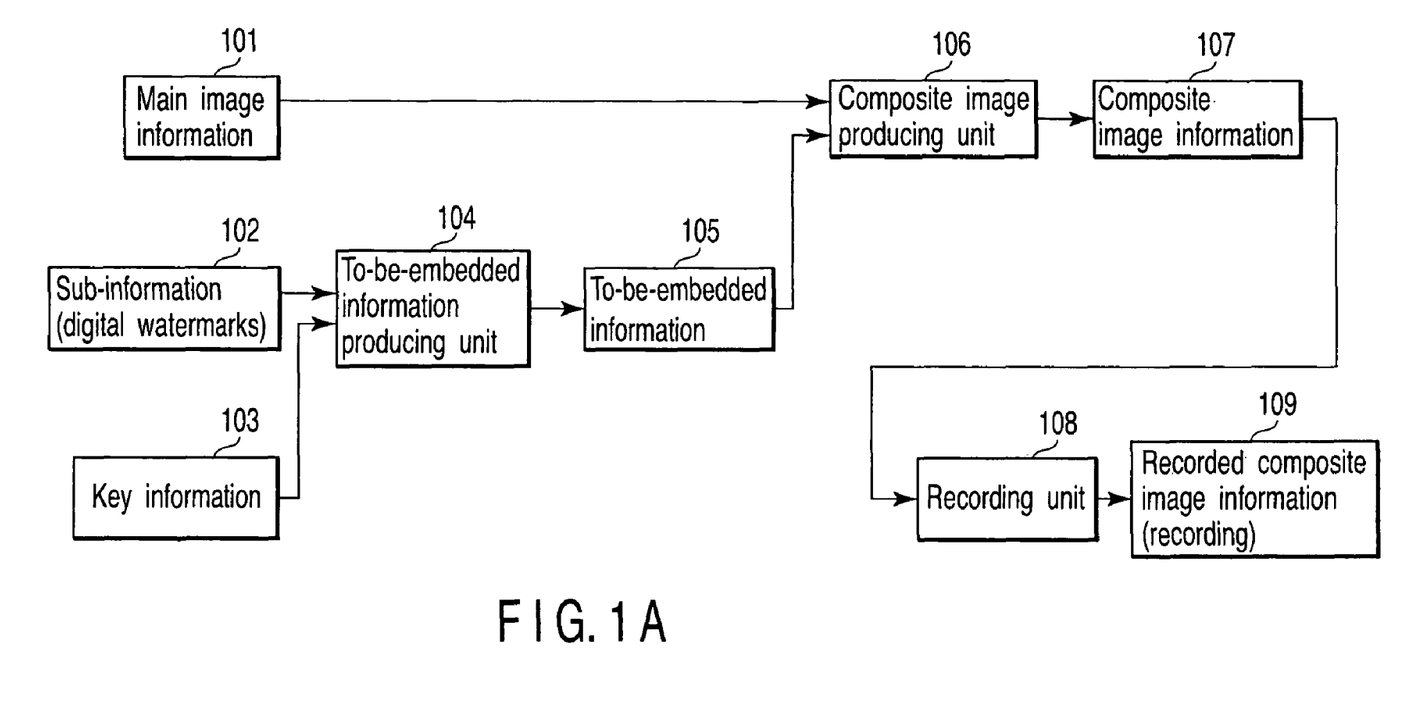
FIG. 1A is a schematic diagram of a composite image producing device according to a first embodiment.

FIG. 1A schematically shows the configuration of a composite image producing device according to the first embodiment. The composite image producing device performs a so-called digital watermarking process of producing a composite image by embedding invisible sub-information (security information or the like) into visible main image information (a face image). The composite image producing device comprises a to-be-embedded information producing unit 104, a composite image producing unit 106, and a recording unit 108.

The to-be-embedded information producing unit 104 produces to-be-embedded information 105 on the basis of key information 103 and sub-information 102, the key information being used in restoring the sub-information. The composite image producing unit 106 produces composite image information 107 by embedding the to-be-embedded information 105 produced by the to-be-embedded information producing unit 104 into main image information 101 in invisible form. The recording unit 108 records (prints) the composite image information 107 produced by the composite image producing unit 106 on the recording surface of a recording medium in visible form.

The flow of processing in such a configuration as described above will be described hereinafter.

Input information is the main image information 101, the sub-information (digital watermarking information) 102, and the key information 103. The main image information 101 is a face image for personal authentication, for example. The sub-information 102 is, for example, information to increase the security of the main image information, information used to decide authenticity, or information used to manage copyright. The key information 103 is used to extract and restore the sub-information 102 embedded as digital watermarks at a later time.

First, the to-be-embedded information producing unit 104 produces the to-be-embedded information 105 with the sub-information 102 and the key information 103 as input information. Here, the to-be-embedded information is produced by performing a color difference modulation process on given key information on the basis of two or more pieces of key information used in restoring the sub-information 102, the sub-information, and a previously given color difference amount.

Next, the composite image producing unit 106 produces the composite image information 107 with the main image information 101 and the to-be-embedded information 105 produced by the to-be-embedded information producing unit 104 as input information. Here, the composite image information 107 is produced by superimposing the to-be-embedded information 105 on the main image information 101. The composite image information 107 is image information which has digital watermarking information embedded in invisible form.

Next, the recording unit 108 records the composite image information 107 produced by the composite image producing unit 106 on a recording medium as a visible image. Thereby, restored composite image information (recording) 109 is produced. The recording is an identification (ID) card issued to a staff member of a company by way of example.

In the description which follows, the aforementioned sub-information embedding process is referred to as the digital watermark embedding process.

Figure 1B:
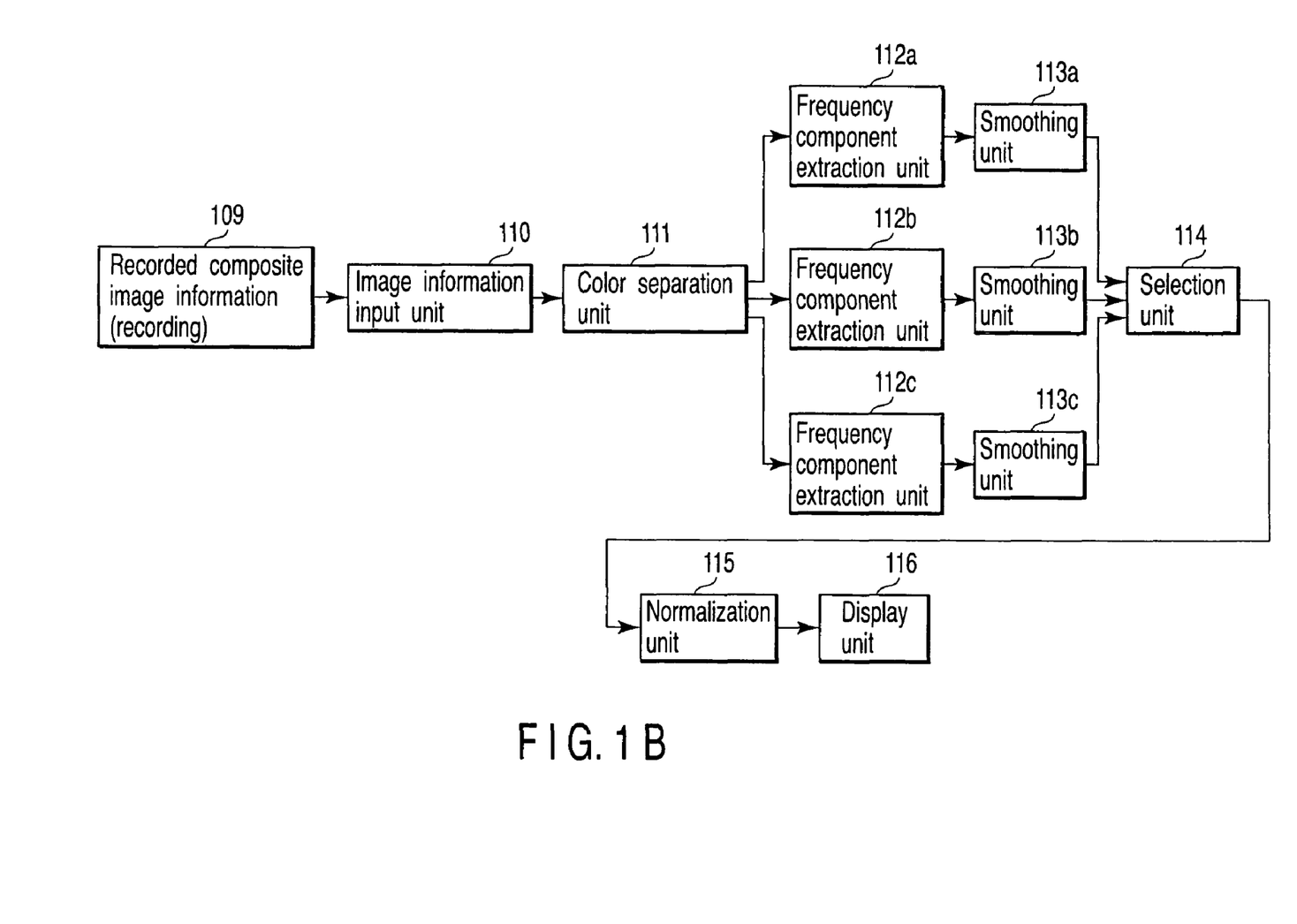
FIG. 1B is a schematic diagram of an image processing device according to the first embodiment.

FIG. 1B schematically shows the configuration of an image processing device according to the first embodiment. The image processing device performs a so-called digital watermark restoring process of restoring the sub-information 102 from the recording 109 produced by the composite image producing device of FIG. 1A. The image processing device is composed of an image information input unit 110, a color separation unit 111, three frequency component extraction units 112a, 112b and 112c, three smoothing units 113a, 113b and 113c, a selection unit 114, a normalization unit 115, and a display unit 116.

The image information input unit 110 takes in composite image information 109 and transforms it into digital image information. The color separation unit 111 separates the composite image information from the image information input unit 110 into a number of color components, for example, color planes of three primary colors of red (R), green (G) and blue (B). Each of the three frequency component extraction units 112a, 112b and 112c extracts frequency components of the sub-information 102 from a corresponding one of the R, G and B image information from the color separation unit 111. Each of the smoothing units 113a, 113b and 113c smoothes the frequency components from a corresponding one of the frequency component extraction units 112a, 112b and 112c. The selection unit 114 makes a selection from among the outputs of the smoothing units 113a, 113b and 113c (the results of the smoothing process). Specifically, the selection unit selects one of the outputs of the smoothing units in predetermined pixel units. For example, assume that the composite image information can be divided into first, second, third, . . . , n-th regions each of a predetermined number of pixels. Then, the selection unit can select the output of the smoothing unit 113a (or 113b or 113c) for the first region, the output of the smoothing unit 113b (or 113a or 113c) for the second region, and the output of the smoothing unit 113c (or 113a or 113b) for the third region. The normalization unit 115 normalizes the output of the selection unit 114. The display unit 116 visually outputs the output of the normalization unit 115.

The flow of processing in such a configuration will be described hereinafter.

First, the image information input unit 110 optically reads the composite image information 109 restored on the ID card and outputs it as digital image information. Next, the color separation unit 111 separates the image information from the image information input unit 110 into color planes of three primary colors of R, G and B.

Next, each of the frequency component extraction units 112a, 112b and 112c performs a key information frequency component extraction process on image information of a corresponding color plane from the color separation unit 111.

Next, each of the smoothing units 113a, 113b and 113c smoothes a corresponding one of the outputs of the frequency component extraction units 112a, 112b and 112c.

Next, the selection unit 114 selects the optimum one of the outputs of the smoothing units 113a, 113b and 113c and sends it to the normalization unit 115.

Next, the normalization unit 115 normalizes the input value (the output of the selection unit 114) so that it falls within a range of brightness value from 0 to 255. Finally, the display unit 116 visually displays the output of the normalization unit 115.

Although, in the embodiment, the color separation unit 111 is adapted to separate input image information into color planes of three primary colors of R, G and B, this is not restrictive. The input image information may be separated into color planes of cyan (C), magenta (M), and yellow (Y) by way of example.

Hereinafter, the sub-information restoration process illustrated in FIG. 1B is referred to as the digital watermark restoration process.

Figure 2:
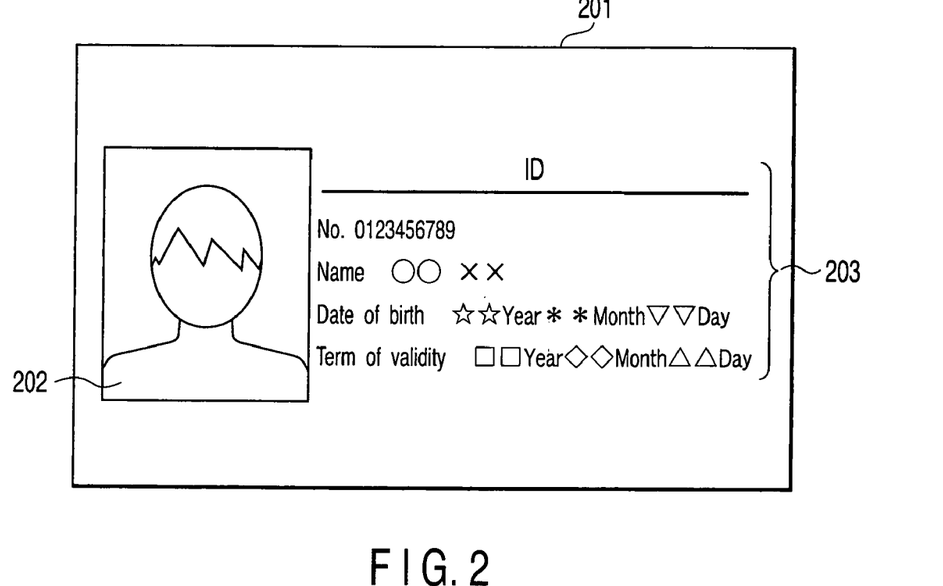
FIG. 2 is a schematic plan view of an ID card.

FIG. 2 shows an example of an ID card 201 (corresponding to the recording,109). The ID card 201 is restored with an owner's face image 202 for personal authentication, which has been produced and restored in accordance with the processing described in conjunction with FIG. 1A. In addition, personal information 203, such as the name, the date of birth and the term of validity, has also been restored. By using such personal information 203 as the side-information 102 in the digital watermark embedding process illustrated in FIG. 1A, the face image 202 for personal authentication and the personal information 203 are associated with each other, thus making it difficult to alter part of the ID card 201 or forge the ID card. Thus, security can be increased.

Figure 3:
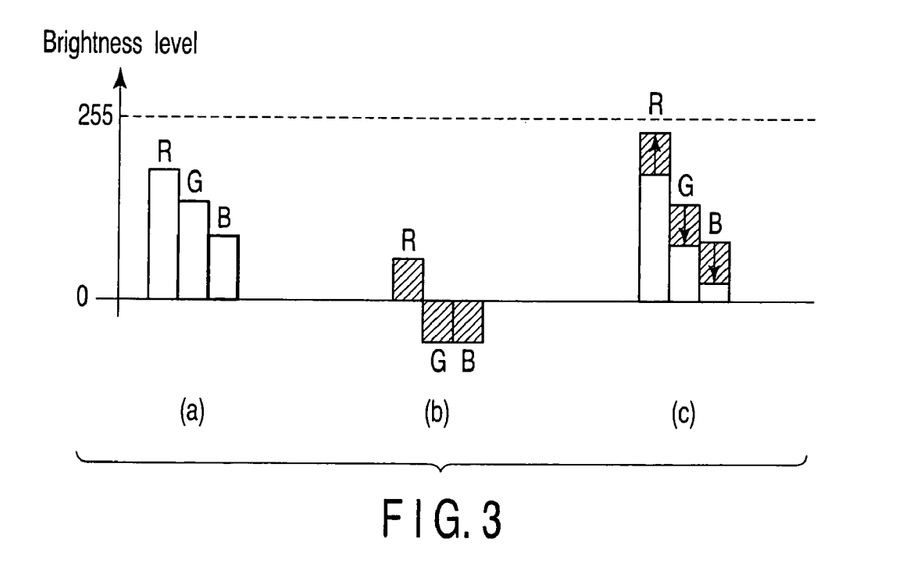
FIG. 3 is a diagram for use in explanation of digital watermark superimposition processing.

FIG. 3 shows an example of a digital watermark embedding process utilizing superimposition processing. In this embodiment, use may be made of a digital watermarking method utilizing color difference and superimposition processing, which is disclosed in, for example, JPA 2005-184603 (KOKAI).

First, color difference modulation processing will be described.

To-be-embedded information is produced from the key information 103 by means of color difference modulation processing according to the following expressions (A-1) to (A-6):

$$KEY(x, y) = \text{white pixel}$$

$$\rightarrow EMD(x, y)\text{-}R = +\Delta CD\text{-}R \quad (A\text{-}1)$$

$$\rightarrow EMD(x, y)\text{-}G = -\Delta CD\text{-}G \quad (A\text{-}2)$$

$$\rightarrow EMD(x, y)\text{-}B = -\Delta CD\text{-}B \quad (A\text{-}3)$$

$$KEY(x, y) = \text{black pixel}$$

$$\rightarrow EMD(x, y)\text{-}R = -\Delta CD\text{-}R \quad (A\text{-}4)$$

$$\rightarrow EMD(x, y)\text{-}G = +\Delta CD\text{-}G \quad (A\text{-}5)$$

$$\rightarrow EMD(x, y)\text{-}B = +\Delta CD\text{-}B \quad (A\text{-}6)$$

where KEY(x, y) is key information, EMD(x, y) is to-be-embedded information (the result of color difference modulation), and $\Delta CD$ is the amount of color difference.

As the result of color difference modulation, a portion of key information corresponding to white pixels becomes rich in red (R-rich) and a portion of key information corresponding to black pixels becomes rich in cyan (C-rich). Since cyan is the complement of red, the addition of both colors results in an achromatic color. Thus, by setting the pixel pitch to a high resolution which is above the limits of visibility of the human eye (about 300 dpi), to-be-embedded information resulting from color difference modulation becomes achromatic (gray) because the human eye cannot distinguish between red and cyan. The utilization of this property allows the pattern of key information to be replaced apparently with achromatic information.

With the above expressions, color difference modulation is made so that, when key information is white pixels, they become rich in cyan and, in the case of black pixels, they become rich in red. However, this relationship is not absolute and, in principle, may be reversed such that white pixels become rich in red and black pixels become rich in cyan.

The to-be-embedded information satisfies at least one of the following three conditions of identity: the first condition that the absolute values of brightness levels of color components in a given region of the to-be-embedded information are identical (the absolute values of brightness levels of R, G and B components as shown in (b) of FIG. 3); the second condition that the frequency components corresponding to the color components are identical; and the third condition that the phase differences corresponding to the color components are identical.

Next, the superimposition processing will be described.

Main image information, to-be-embedded information for superimposition, and composite image information at coordinates (x, y) in an image are defined as follow:

$$\text{main image information: SRC-C}(x, y) \quad (B\text{-}1)$$

$$\text{to-be-embedded information: EMD-C}(x, y) \quad (B\text{-}2)$$

$$\text{composite image information: DES-C}(x, y) \quad (B\text{-}3)$$

where x and y are coordinate values in the image (the coordinate size is assumed to be the same for all the information) and C indicates color planes of R, G and B. The main image information, the to-be-embedded information and the composite image information correspond to (a), (b), and (c) of FIG. 3, respectively. Each information value is represented by an integer in the range of 0 to 255 in the case of 24-bit color representation.

As the result of the above definition, the superimposition processing is expressed as follows:

$$DES\text{-}R(x, y) = SRC\text{-}R(x, y) + EMD\text{-}R(x, y) \quad (C\text{-}1)$$

$$DES\text{-}G(x, y) = SRC\text{-}G(x, y) + EMD\text{-}G(x, y) \quad (C\text{-}2)$$

$$DES\text{-}B(x, y) = SRC\text{-}B(x, y) + EMD\text{-}B(x, y) \quad (C\text{-}3)$$

This system allows sub-information to be embedded into main image information in invisible form without degrading image quality through the use of the following:

(1) utilization of human visual characteristics
    the higher the image frequency, the lower the gradation discrimination ability
    color difference information is harder to distinguish than brightness information (2) complementary colors: red+cyan=achromatic color (white) (additive mixture of colors)

(3) application of the relationship of complementary colors and color difference information (color difference modulation) to a high-frequency carrier pattern image.

In the example of (2), red and cyan (blue+green) are complementary to each other in the case of additive mixture of colors. Even if these two colors are adjacent to each other, it is difficult for the human eye to distinguish them and hence they look achromatic.

As in (3), when a high-frequency carrier pattern image is used, red-rich pixels and cyan-rich pixels are arranged repetitively. The human eye cannot distinguish such fine color difference between pixels and will therefore judge the amount of color difference to be 0. Such human eye characteristics are utilized.

Next, the digital watermark restoration processing will be described.

First, a description is given of the condition of composite image information which is a candidate for restoration processing.

Figure 4:
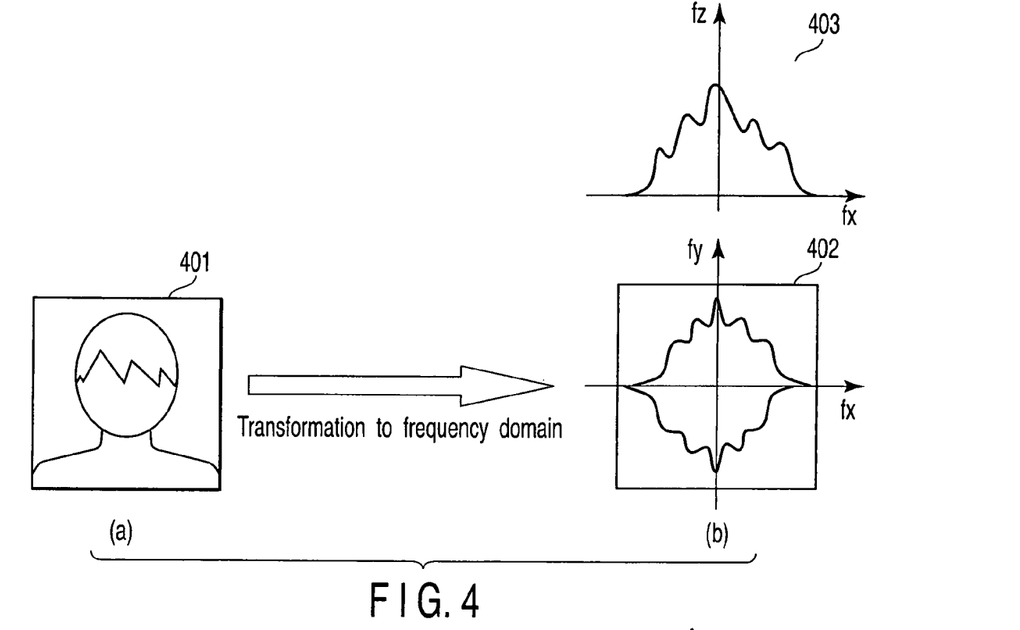
FIG. 4 schematically shows the frequency distribution of main image information.

FIG. 4 shows an example of transformation of main image information (human face image) used in this embodiment from space domain to frequency domain. Portion (a) of FIG. 4 shows a human face image 401 for personal authentication, and portion (b) of FIG. 4 schematically shows signal amplitude levels in frequency domain. In portion (b) of FIG. 4, there are illustrated a frequency distribution 402 on the x-y plane and a frequency distribution 403 on the x-z plane. In general, a natural image, such as a human face image, is high in signal level in the central region in which frequencies are low and the signal level goes lower as the distance from the central region increases (i.e., the frequency increases).

Figure 5:
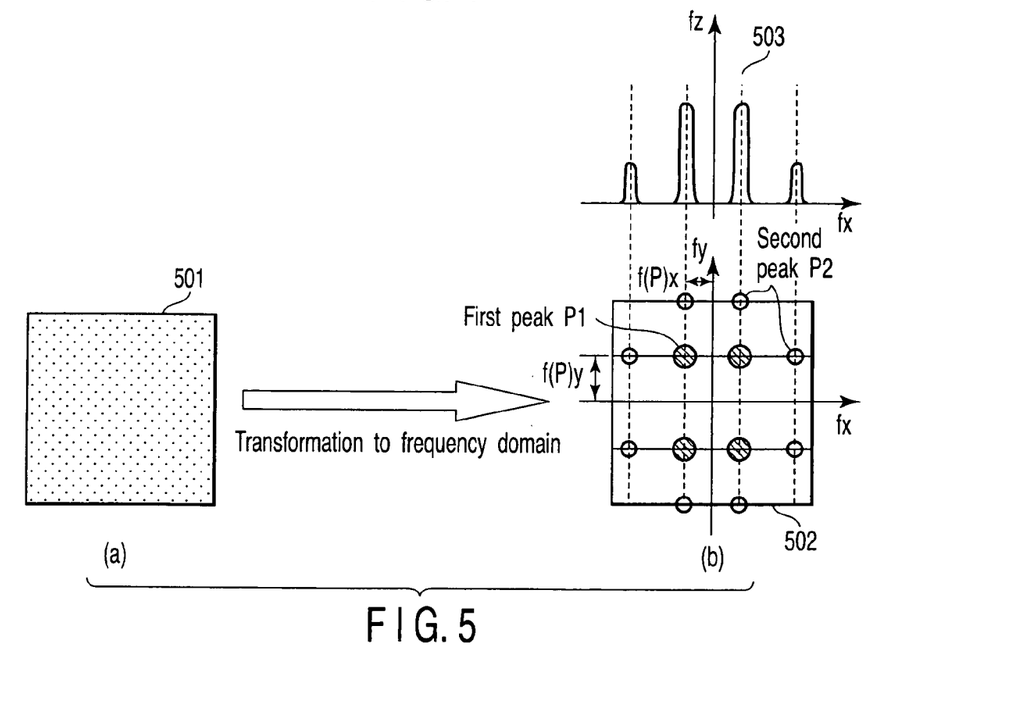
FIG. 5 schematically shows the frequency distribution of key information.

FIG. 5 shows an example of transformation of key information from space domain to frequency domain. The key information of FIG. 5 is transformed into a black and white two-valued image by taking 1s in a bit string of 1s and 0s as black pixels and 0s as white pixels by way of example.

Portion (a) of FIG. 5 schematically shows key information 501 transformed into a black and white two-valued image, and portion (b) of FIG. 5 schematically shows signal amplitude levels in frequency domain. In portion (b) of FIG. 5, there are illustrated a frequency distribution 502 on the x-y plane and a frequency distribution 503 on the x-z plane. For example, first peaks P1 are present at four points as shown in (b) of FIG. 5. High-frequency components each of the period of an odd submultiple of the fundamental period appear as second peaks P2 and third peaks (not shown) in the x and y directions.

Figure 6:
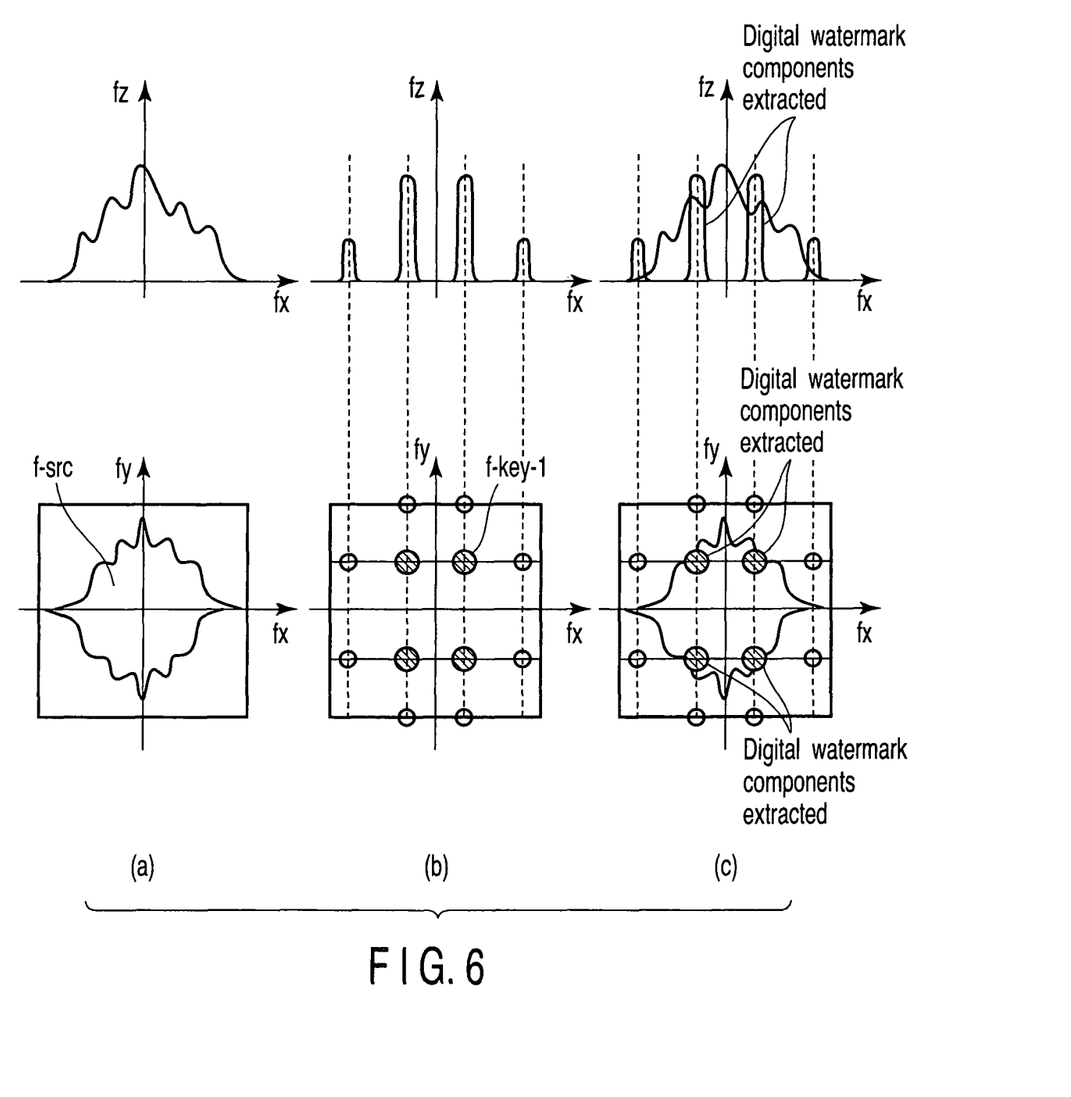
FIG. 6 schematically shows the frequency distribution of composite image information.

FIG. 6 schematically shows transformation of the superimposition processing indicated by the above expressions (C-1), (C-2) and (C-3) to frequency domain representation.

Portion (a) of FIG. 6 is a frequency domain representation of the main image information. Portion (b) of FIG. 6 is a frequency domain representation of the key information. Portion (c) of FIG. 6 is a frequency domain representation of the composite image information. Exactly, portion (b) of FIG. 6 is not a frequency domain representation of the key information but a frequency domain representation of to-be-embedded information. With the color difference modulation, in terms of a specific one of the R, G and B color planes, the key information have its frequencies not changed at all and is transformed into to-be-embedded information as it is. Namely, it doesn't matter to regard the frequency domain representation of key information as the frequency domain representation of to-be-embedded information.

As the result of superimposition processing, as shown in (c) of FIG. 6, the composite image information has the frequency distribution of the main image information and the frequency distribution of the key information superimposed on one another as viewed on the x-y plane.

The frequency component extraction units 112a, 112b and 112c detect and extract the frequency components of the key information from the frequency components of the composite image information as shown in (c) of FIG. 6 to make a return from the state of (c) of FIG. 6 to that of (b) of FIG. 5.

Figure 7:
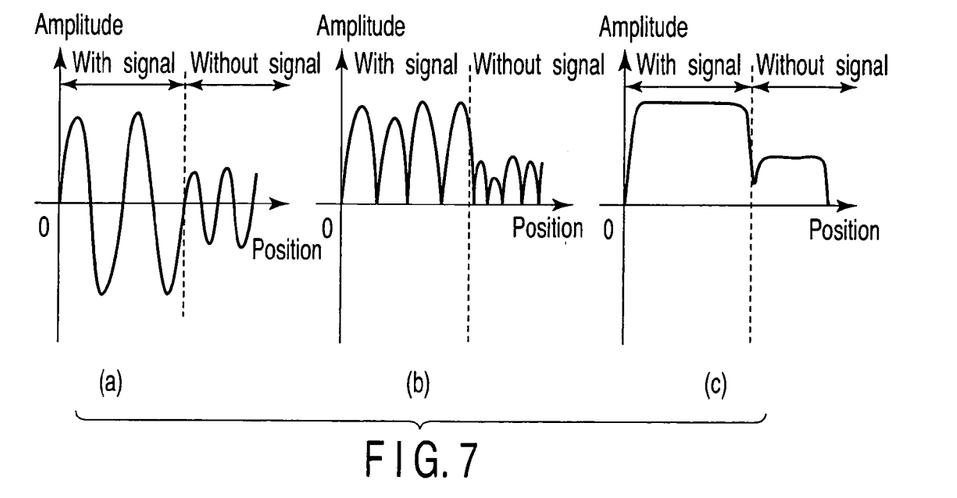
FIG. 7 is a diagram for use in explanation of the smoothing process.

FIG. 7 schematically shows the contents of processing by the smoothing units 113a, 113b and 113c.

The signals extracted by the frequency component extraction units 112a, 112b and 112c are represented, for example, as shown in (a) of FIG. 7. In FIG. 7, the horizontal axis represents the position in the x or y direction and the vertical axis represents the amplitude (signal level). As a matter of fact, the amplitude and position of frequency components of a two-dimensional image cannot be represented by such a simple two-dimensional graph as shown in (a) of FIG. 7.

As shown in (a) of FIG. 7, there are waves relatively large in amplitude and waves relatively small in amplitude. The portion of large-amplitude waves is a portion in which digital watermarks have been extracted and labeled "with signal". The portion of small-amplitude waves is a portion where digital watermarks have not been extracted and labeled "without signal".

The graph of (a) in FIG. 7 is difficult for the human eye to understand. Performing constant multiplication processing on the absolute-value version of the graph of (a) in FIG. 7 for easier understanding results in the graph of (b) in FIG. 7.

Further, by setting reference regions in give region units and then performing moving average processing, the graph of (c) in: FIG. 7 results, which allows the portion labeled "with signal" and the portion labeled "without signal" to be distinguished relatively clearly.

Next, a description is given of the selection unit 114.

Here, the outputs of the smoothing units 113a, 113b and 113c form input values to the selection unit. The selection unit selects the optimum one from among the three input values and sends it to the normalization unit 115.

In this embodiment, the signal-to-noise ratio (SNR) of each of the outputs of the smoothing units is detected and one of the outputs which has the highest SNR is selected as the optimum value. The SNR is calculated as follows:

$$SNR = 10*\log(PS/PN)$$

where PS is the watermark signal and PN is the noise signal.

Alternatively, it is also possible to select, as the optimum value, one of the outputs of the smoothing units which is detected to have the highest signal level.

Furthermore, it is also possible to detect the SNR and the signal level of each of the outputs of the smoothing units and select one of the outputs of the smoothing units as the optimum value on the basis of the results of detection. That is, the optimum value is selected taking both the SNR and the signal level into consideration.

The embodiment first separates input image information into colors, then performs frequency extraction and smoothing processing, and selects the optimum output through comparison among the results of the above processing for color planes, thereby allowing digital watermarks (sub-information) to be restored stably without being affected by the color distribution of main image information.

Figure 8:
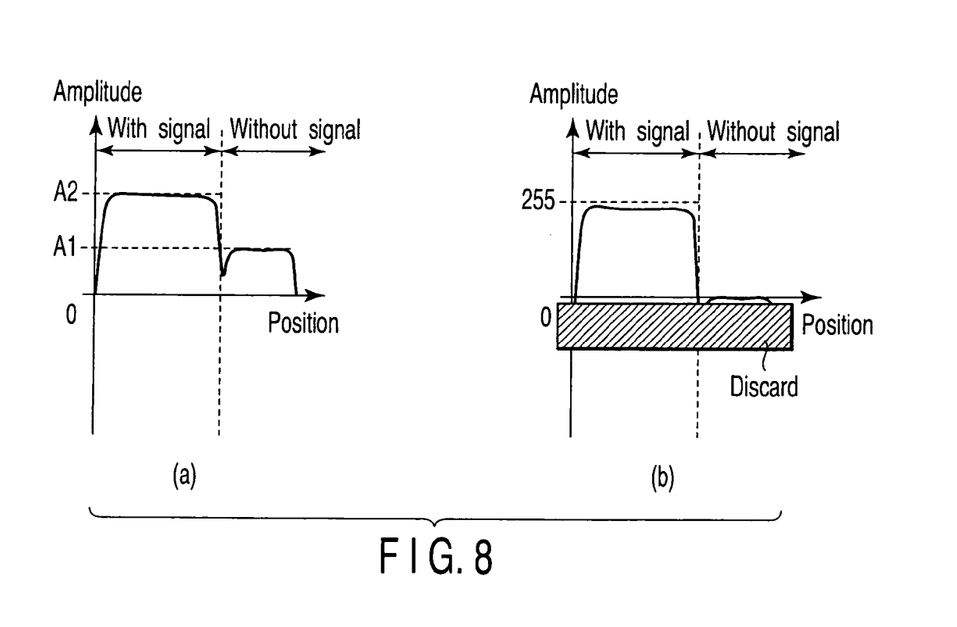
FIG. 8 is a diagram for use in explanation of the normalization process.

FIG. 8 schematically shows the contents of processing by the normalization unit 115.

The result of smoothing processing selected by the selection unit 114 is a mixture of a waveform having a relatively large peak A2 and a waveform having a relatively small peak A1 as shown in (a) of FIG. 8. For the waveform of peak A1, no digital watermark signal is extracted and hence this waveform is not needed.

The normalization processing is therefore performed. In general, eight bits are allocated for each color plane for digital processing. Coordinate transformation is thus made so that the minimum value is 0 and the maximum value is 255. The exemplary result is shown in portion (b) of FIG. 8. Portion (b) of FIG. 8 shows signals whose values are below 0 for ease of understanding. In practice, however, these signals are discarded and other signals are transformed so that they fall within the range of 0 to 255.

Finally, the display unit 116 visually displays the results of restoration processing. At this point, the output image is subjected to gamma correction as indicated by $$OUT=255*(IN/25)^\gamma \quad \text{(G-1)}$$

where IN is a signal value before gamma correction, OUT is a signal value after gamma correction, and $\gamma$ is a gamma correction parameter (1.5 to 4.0). Owing to gamma correction, the output image is visually improved.

As described above, the first embodiment is adapted to take out a digital watermark signal from each of signals corresponding to R, G and B (or C, M and Y) color planes, perform restoration processing on each of the resulting digital watermark signals, and select the optimum one from among the results of the restoration processing. Therefore, sub-information (digital watermark information) can be restored stably without being affected by the color distribution of main image information.

A second embodiment will be described next.

Figure 9A:
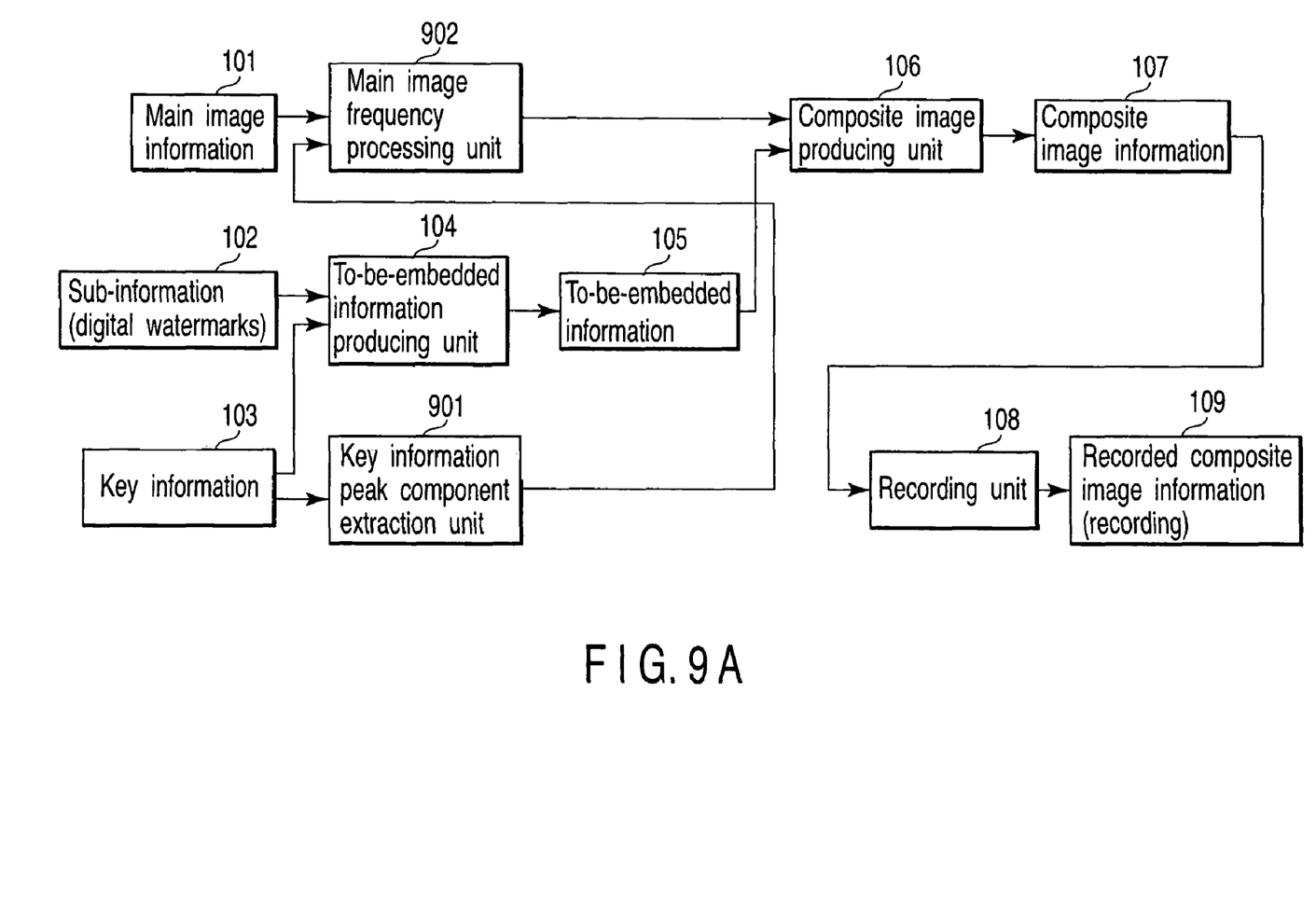
FIG. 9A is a schematic diagram of a composite image producing device according to a second embodiment.

FIG. 9A schematically shows the configuration of a composite image producing device according to the second embodiment. This device is different from the device of the first embodiment in that it is equipped with a key information peak component extraction unit 901 and a main image frequency processing unit 902. The key information peak component extraction unit 901 transforms key information used later in restoring sub-information to frequency domain and then extracts the frequency components of a first peak. The main image frequency processing unit 902 removes or reduces the frequency components of the first peak from main image information before the sub-information is embedded.

The flow of processing in such a configuration will be described below.

First, the to-be-embedded information producing unit 104 receives sub-information 102 and key information 103 to produce to-be-embedded information 105.

Next, the key information peak component extraction unit 901 receives the key information 103 to extract its peak component. Here, the key information 103 used in restoration is first transformed into a two-dimensional image and then undergoes transformation from two-dimensional space domain to frequency domain through Fourier transformation by way of example. After that, a first peak component in the frequency domain is extracted. The first peak component here refers to the region in which the signal amplitude level is the highest.

Next, the main image frequency processing unit 902 receives the first peak component extracted by the key information peak component extraction unit 901 and the 5 main image information 101 to carry out main image frequency processing. Here, the main image information 101 undergoes transformation from space domain to frequency domain through Fourier transform. Then, frequency components corresponding to the first peak component of the key information 103 are reduced or removed from the main image information 101 to produce new image information 101'.

Next, the composite image producing unit 106 receives the new image information 101' from the main image frequency processing unit 105 and the to-be-embedded information 105 from the to-be-embedded information producing unit 104 to produce composite image information 107. Here, the composite image information 107 is produced by superimposing the to-be-embedded information 105 on the new main image information 101'.

Next, the recording unit 108 records the composite image information 107 on a recording medium as an visible image. Thereby, the restored composite image information (recording) is produced.

Figure 9B:
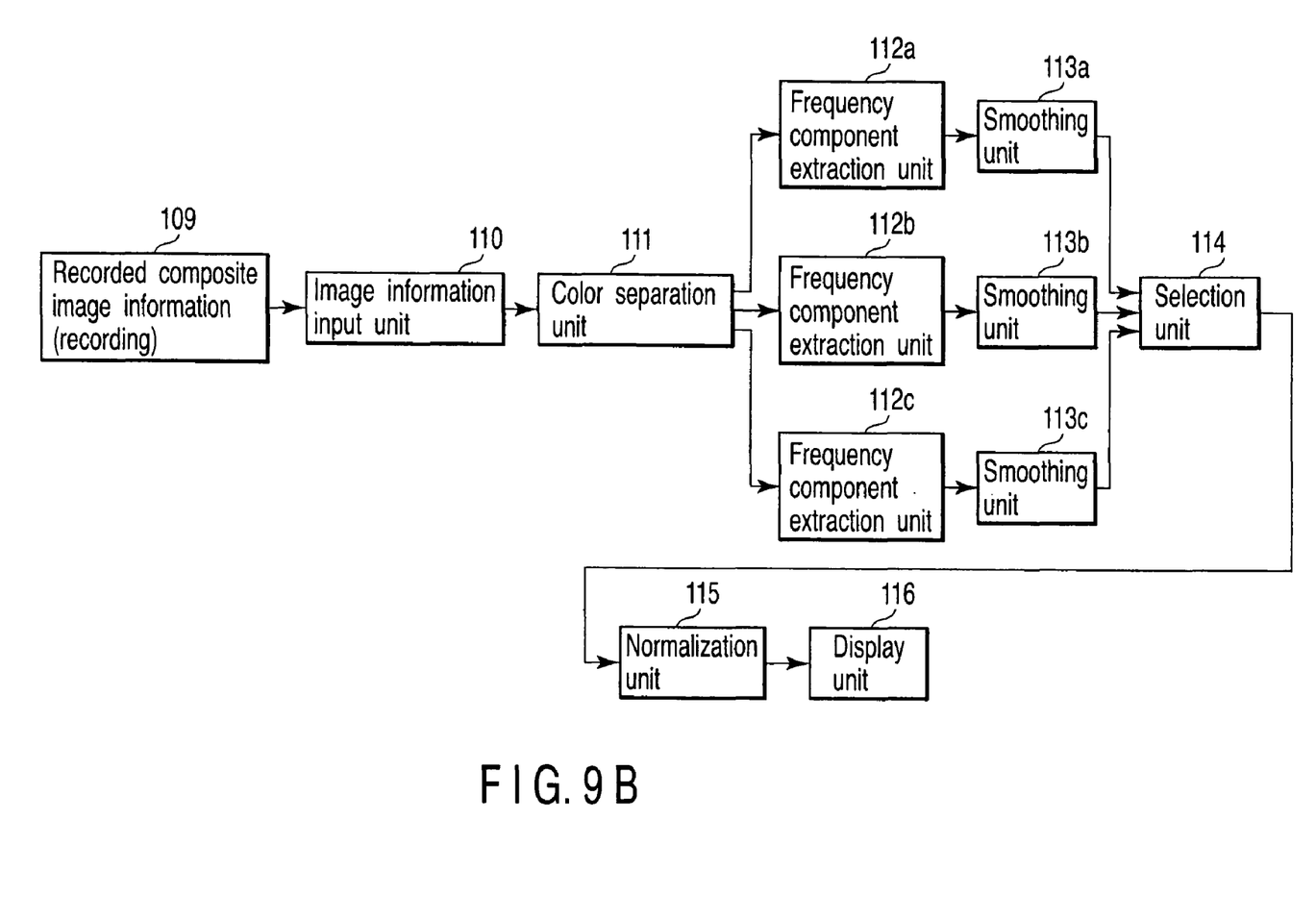
FIG. 9B is a schematic diagram of an image processing device according to the second embodiment.

FIG. 9B schematically shows the configuration of an image processing device according to the second embodiment. This device carries out so-called digital watermark restoration processing to restore the sub-information 102 from the recording 109 produced by the composite image producing device of FIG. 9A. The image processing device of the second embodiment remains unchanged in basic configuration from the counterpart of the first embodiment.

The utility of the second embodiment will be described below with reference to FIG. 10.

Figure 10:
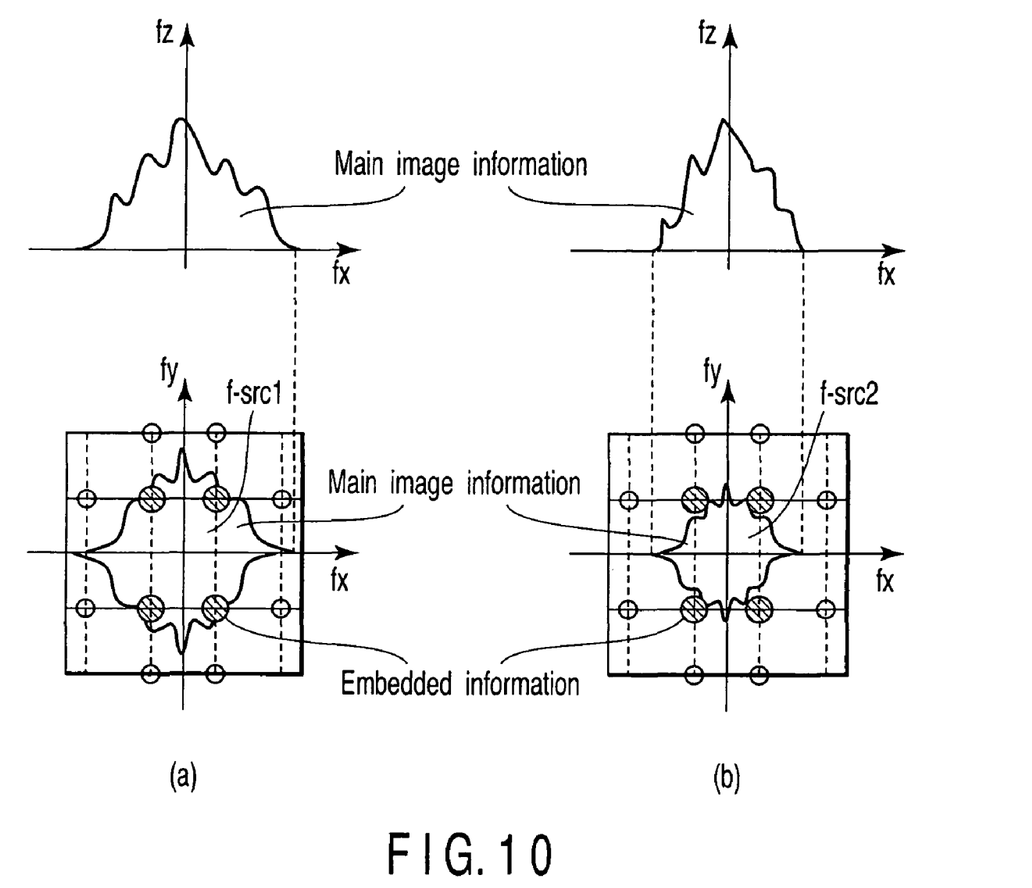
FIG. 10 schematically shows the frequency distribution of composite image information in the second embodiment.

Portion (a) in FIG. 10 schematically shows the frequency distribution as the result of the embedding process using the main image information 101 in the first embodiment. Portion (b) in FIG. 10 schematically shows the frequency distribution as the result of the embedding process using the new main image information 101' in the second embodiment.

In portion (a) of FIG. 10, the frequency distribution of the main image information 101 and the frequency distribution of the embedded information (key information) 105 are superimposed on each other. In restoration processing, therefore, frequency interference is liable to occur in the frequency component extraction units 112a, 112b and 112c.

In portion (b) of FIG. 10, on the other hand, the frequency distribution of the main image information 101 and the frequency distribution of the embedded information 105 are little superimposed on each other. Thus, no frequency interference occurs in the frequency component extraction units 112a, 112b and 112c. For this reason, in restoration processing, noise is reduced and the SNR increases. That is, there is little adverse effect on the result of restoration. It therefore becomes possible to detect only the frequency components of the key information 103 with accuracy in restoration processing. As described above, the second embodiment is configured to remove frequency components that affect digital watermarks from original main image information, which makes it difficult for frequency interference to occur in sub-information restoration processing. Therefore, the sub-information (digital watermarks) can be restored stably without being affected by the color and frequency distributions of the main image information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method of restoring, from composite image information produced through a composite image producing process which involves embedding invisible sub-information into visible main image information to produce the composite image information, the sub-information, comprising:

separating the composite image information into a plurality of color components;

extracting frequency components of the sub-information from each of the separated color components of the main image information;

smoothing the extracted frequency components of the sub-information in each of the plurality of color components;

selecting one from among the results of the smoothing process for frequency components in the plurality of color components;

normalizing the selected result of the smoothing process; and outputting the result of the normalizing process.

2. The method according to claim 1, wherein one of the results of the smoothing process is selected in given pixel units.

3. The method according to claim 1, wherein the composite image producing process involves producing to-be-embedded information on the basis of the sub-information and key information and embedding the to-be-embedded information into the main image information.

4. The method according to claim 1, wherein the composite image producing process involves removing or reducing predetermined frequency components contained in the main image information which affect the restoration of the sub-information, producing to-be-embedded information on the basis of the sub-information and key information, and embedding the to-be-embedded information into the main image information having the predetermined frequency components removed or reduced.

5. The method according to claim 1, wherein the composite image producing process involves extracting peak frequency components from the frequency components of the key information, removing or reducing the peak frequency components from the frequency components of the main image information, producing to-be-embedded information on the basis of the sub-information and the key information, and embedding the to-be-embedded information into the main image information having the predetermined frequency components removed or reduced to thereby produce the composite image information.

6. The method according to claim 3, wherein the to-be-embedded information is composed of a plurality of color components and satisfies at least one of the following conditions of identity: the condition that absolute values of brightness levels of the color components in a predetermined area in the to-be-embedded information; the condition that frequency components corresponding to the color components are identical; and the condition that phase differences corresponding to the color components are identical.

7. The method according to claim 1, wherein the composite image information is separated into color planes of red (R), green (G), and blue (B) or color planes of cyan (C), magenta (M), and yellow (Y).

8. The method according to claim 1, wherein the signal-to-noise ratio of each of the results of the smoothing process for frequency components in the plurality of color components is detected, and one of the results of the smoothing process which is the highest in signal-to-noise ratio is selected.

9. The method according to claim 1, wherein the signal level of each of the results of the smoothing process for frequency components in the plurality of color components is detected, and one of the results of the smoothing process which is the highest in signal level is selected.

10. The method according to claim 1, wherein the signal-to-noise ratio and the signal level of each of the results of the smoothing process for frequency components in the plurality of color components is detected, and one of the results of the smoothing process is selected on the basis of the results of detection of the signal-to-noise ratio and the signal level.

11. An image processing device embodied on non-transitory computer readable media and adapted to restore, from composite image information produced by a composite image producing device which embeds invisible sub-information into visible main image information to produce the composite image information, the sub-information, comprising:

a color separation unit configured to separate the composite image information into a plurality of color components;

extraction units each of which is configured to extract frequency components of the sub-information contained in a corresponding one of the plurality of color components;

smoothing units each of which is configured to smooth the frequency components of the sub-information extracted by a corresponding one of the smoothing units;

a selection unit configured to select one of the outputs of the smoothing units;

a normalization unit configured to normalize the selected one of the outputs of the smoothing units; and an output unit configured to output the output of the normalization unit.

12. The device according to claim 11, wherein the selection unit selects one of the outputs of the smoothing units in given pixel units.

13. The device according to claim 11, wherein the composite image producing device comprises a to-be-embedded information producing unit configured to produce to-be-embedded information on the basis of the sub-information and key information, and a composite image information producing unit configured to embed the to-be-embedded information into the main image information to thereby produce the composite image information.

14. The device according to claim 11, wherein the composite image producing device comprises a main image information processing unit configured to remove or reduce predetermined frequency components contained in the main image information which affects the restoration of the sub-information, a to-be-embedded information producing unit configured to produce to-be-embedded information on the basis of the sub-information and key information, and a composite image information producing unit configured to embed the to-be-embedded information into the main image information having the predetermined frequency components removed or reduced to thereby produce the composite image information.

15. The device according to claim 11, wherein the composite image producing device comprises a peak frequency component extracting unit configured to extract peak frequency components from the frequency components of the key information, a main image information processing unit configured to remove or reduce the peak frequency components from the frequency components of the main image information, a to-be-embedded information producing unit configured to produce to-be-embedded information on the basis of the sub-information and the key information, and a composite image information producing unit configured to embed the to-be-embedded information into the main image information having the predetermined frequency components removed or reduced to thereby produce the composite image information.

16. The device according to claim 13, wherein the to-be-embedded information is composed of a plurality of color components and satisfies at least one of the following conditions of identity: the condition that absolute values of brightness levels of the color components in a predetermined area in the to-be-embedded information; the condition that frequency components corresponding to the color components are identical; and the condition that phase differences corresponding to the color components are identical.

17. The device according to claim 11, wherein the color separation units separate the composite image information is separated into color planes of red (R), green (G), and blue (B) or color planes of cyan (C), magenta (M), and yellow (Y).

18. The device according to claim 11, wherein the selection unit detects the signal-to-noise ratio of each of the outputs of the smoothing units and selects one of the outputs of the smoothing units which is the highest in signal-to-noise ratio.

19. The device according to claim 11, wherein the selection unit detects the signal level of each of the outputs of the smoothing units and selects one of the outputs of the smoothing units which is the highest in signal level.

20. The device according to claim 11, wherein the selection unit detects the signal-to-noise ratio and the signal level of each of the outputs of the smoothing units and selects one of the outputs of the smoothing units on the basis of the results of detection of the signal-to-noise ratio and the signal level.

21. An image processing method of restoring sub-information from composite image information produced through a composite image producing process which involves producing invisible to-be-embedded information by the sub-information, key information used in restoring the sub-information and a color difference modulation process on the key information and embedding the invisible to-be-embedded information into visible main image information, the image processing method comprising:

separating the composite image information into a plurality of color components;

extracting frequency components of the to-be-embedded information from each of the separated color components of the main image information, the frequency components of the to-be-embedded information being regarded as the frequency components of the key information;

smoothing the extracted frequency components of the key information in each of the plurality of color components;

selecting one from among the results of the smoothing process for frequency components in the plurality of color components;

normalizing the selected result of the smoothing process; and     outputting the result of the normalizing process.

22. An image processing device embodied on non-transitory computer readable media and adapted to restore sub-information from composite image information produced by a composite image producing device which produces invisible to-be-embedded information by the sub-information, key information used in restoring the sub-information and a color difference modulation process on the key information and embeds the invisible to-be-embedded information into visible main image information, the image processing device comprising:

a color separation unit configured to separate the composite image information into a plurality of color components;

extraction units each of which is configured to extract frequency components of the to-be-embedded information contained in a corresponding one of the plurality of color components, the frequency components of the to-be-embedded information being regarded as the frequency components of the key information;

smoothing units each of which is configured to smooth the frequency components of the key information extracted by a corresponding one of the smoothing units;

a selection unit configured to select one of the outputs of the smoothing units;

a normalization unit configured to normalize the selected one of the outputs of the smoothing units; and     an output unit configured to output the output of the normalization unit.

\* \* \* \* \*